US010366490B2

(12) United States Patent
Xu et al.

(10) Patent No.: US 10,366,490 B2
(45) Date of Patent: Jul. 30, 2019

(54) HIGHLY INTEGRATED ANNOTATION AND SEGMENTATION SYSTEM FOR MEDICAL IMAGING

(71) Applicant: Siemens Healthcare GmbH, Erlangen (DE)

(72) Inventors: Zhoubing Xu, Plainsboro, NJ (US); Carol L. Novak, Newtown, PA (US); Atilla Peter Kiraly, Plainsboro, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 59 days.

(21) Appl. No.: 15/470,360

(22) Filed: Mar. 27, 2017

(65) Prior Publication Data
US 2018/0276815 A1    Sep. 27, 2018

(51) Int. Cl.
*G06K 9/00*    (2006.01)
*G06T 7/00*    (2017.01)
(Continued)

(52) U.S. Cl.
CPC ......... *G06T 7/0012* (2013.01); *G06N 3/0445* (2013.01); *G06N 3/08* (2013.01);
(Continued)

(58) Field of Classification Search
None
See application file for complete search history.

(56) References Cited

U.S. PATENT DOCUMENTS 8,600,143 B1 * 12/2013 Kulkarni ............ G06K 9/00147
382/133
9,058,317 B1 *  6/2015 Gardner .............. G06F 17/2755
(Continued)

FOREIGN PATENT DOCUMENTS

EP           2672396 A1 * 12/2013    ....... G06F 17/30247

OTHER PUBLICATIONS

Branson, S., Perona, P., & Belongie, S. (Nov. 2011). Strong supervision from weak annotation: Interactive training of deformable part models. In Computer Vision (ICCV), 2011 IEEE International Conference on (pp. 1832-1839). IEEE.*
(Continued)

*Primary Examiner* — Samah A Beg (57) ABSTRACT

A method for training a segmentation correction model includes performing an iterative model training process over a plurality of iterations. During each iteration, an initial segmentation estimate for an image is provided to a human annotators via an annotation interface. The initial segmentation estimate identifies one or more anatomical areas of interest within the image. Interactions with the annotation interface are automatically monitored to record annotation information comprising one or more of (i) segmentation corrections made to the initial segmentation estimate by the annotators via the annotation interface, and (ii) interactions with the annotation interface performed by the annotators while making the corrections. A base segmentation machine learning model is trained to automatically create a base segmentation based on the image. Additionally, a segmentation correction machine learning model is trained to automatically perform the segmentation corrections based on the image.

14 Claims, 4 Drawing Sheets

(51) Int. Cl.
G06N 3/08 (2006.01)
G06N 3/04 (2006.01)
G06T 7/11 (2017.01)
G06T 11/60 (2006.01)

(52) U.S. Cl.
CPC ............... *G06T 7/11* (2017.01); *G06T 11/60* (2013.01); *G06T 2207/20081* (2013.01); *G06T 2207/20084* (2013.01)

(56) References Cited

U.S. PATENT DOCUMENTS

| | | | | |
|---|---|---|---|---|
| 9,348,815 | B1* | 5/2016 | Estes | G06F 17/2785 |
| 9,552,549 | B1* | 1/2017 | Gong | G06N 3/084 |
| 9,700,276 | B2* | 7/2017 | Zhang | A61B 6/5211 |
| 9,785,858 | B2* | 10/2017 | Seifert | G06K 9/4638 |
| 9,799,120 | B1* | 10/2017 | Fenchel | G06K 9/627 |
| 9,811,906 | B1* | 11/2017 | Vizitiu | G06T 7/11 |
| 2004/0250201 | A1* | 12/2004 | Caspi | G06F 17/241 |
| | | | | 715/233 |
| 2007/0244702 | A1* | 10/2007 | Kahn | G10L 15/22 |
| | | | | 704/260 |
| 2008/0298766 | A1* | 12/2008 | Wen | G06F 16/5854 |
| | | | | 386/282 |
| 2009/0148007 | A1* | 6/2009 | Zhao | G06K 9/6255 |
| | | | | 382/128 |
| 2010/0322489 | A1 | 12/2010 | Tizhoosh et al. | |
| 2013/0135305 | A1* | 5/2013 | Bystrov | G06T 19/20 |
| | | | | 345/420 |
| 2014/0324808 | A1* | 10/2014 | Sandhu | G06F 17/2785 |
| | | | | 707/706 |
| 2015/0086133 | A1* | 3/2015 | Grady | G06F 17/30268 |
| | | | | 382/278 |
| 2015/0089337 | A1* | 3/2015 | Grady | G06T 19/00 |
| | | | | 715/202 |
| 2015/0150457 | A1* | 6/2015 | Wu | A61B 5/0073 |
| | | | | 600/425 |
| 2017/0278544 | A1* | 9/2017 | Choi | G06F 3/04842 |
| 2018/0012359 | A1* | 1/2018 | Prentasic | G06T 7/0014 |
| 2018/0060652 | A1* | 3/2018 | Zhang | G06K 9/6298 |
| 2018/0116620 | A1* | 5/2018 | Chen | A61B 6/03 |
| 2018/0137628 | A1* | 5/2018 | Shoda | G06K 9/00805 |
| 2018/0165809 | A1* | 6/2018 | Stanitsas | G06T 7/0012 |
| 2018/0204111 | A1* | 7/2018 | Zadeh | G06N 3/0454 |
| 2018/0276825 | A1* | 9/2018 | Dai | G06T 7/11 |

OTHER PUBLICATIONS

Culotta, A., & McCallum, A. (Jul. 2005). Reducing labeling effort for structured prediction tasks. In AAAI (vol. 5, pp. 746-751).*
Viola, Paul, and Michael Jones. "Fast and robust classification using asymmetric adaboost and a detector cascade." Advances in Neural Information Processing System 14 (2001).
Long, Jonathan, Evan Shelhamer, and Trevor Darrell. "Fully convolutional networks for semantic segmentation." Proceedings of the IEEE Conference on Computer Vision and Pattern Recognition. 2015.
Kittur, Aniket, Ed H. Chi, and Bongwon Suh. "Crowdsourcing user studies with Mechanical Turk." Proceedings of the SIGCHI conference on human factors in computing systems. ACM, 2008.
Xu, Zhoubing, et al. "Improving Spleen Volume Estimation Via Computer-assisted Segmentation on Clinically Acquired CT Scans." Academic Radiology (2016).
European Search Report dated Aug. 7, 2018 in corresponding European Patent Application No. 18162624.3.
Xu, et al; "Deep Interactive Object Selection"; 2016 IEEE Conference on Computer Vision and Pattern Recognition (CVPR), IEEE, Jun. 27, 2016 (Jun. 27, 2016), pp. 373-381.
Rajchl, et al; "DeepCut: Object Segmentation From Bounding Box Annotations Using Convolutional Neural Networks"; IEEE Transactions on Medical Imaging., vol. 36, No. 2, Feb. 1, 2017 (Feb. 1, 2017), pp. 374-683.

* cited by examiner

HIGHLY INTEGRATED ANNOTATION AND SEGMENTATION SYSTEM FOR MEDICAL IMAGING

TECHNOLOGY FIELD

The present invention relates generally to methods and systems for automating the annotation and segmentation of medical image data. The techniques described herein may generally be applied to any medical imaging modality including, without limitation, Magnetic Resonance (MR), Ultrasound, and Computed Tomography (CT) images.

BACKGROUND

Automation of medical imaging requires algorithms to learn how to perform a particular task, and these algorithms require "ground truth" data for training and validation. This ground truth data comes from human experts annotating the data, but such annotations are time-consuming and expensive to obtain. Key problems include how to obtain annotation data efficiently, with minimal effort from the human experts, and how to obtain the right amount of labeled data without paying for more than is actually needed. For machine learning algorithms an additional challenge is knowing when a sufficiently accurate result has been achieved. Finally, the entire cycle of annotation, testing, and validation is slow, limiting the overall pace of innovation.

There have been many machine algorithms trained with data annotated by human experts. In a typical development cycle, researchers guess how much training data will be needed and then employ human experts to provide it. Prior research focused on how best to train given a set of annotated data.

Recently, Deep Learning has emerged as a popular and highly effective method for performing image segmentation. A segmentation of an image is produced by portioning an image into different segments. For medical images, these segments may correspond to biologically relevant structures such as organs, blood vessels, pathologies, etc. However one of the biggest limitations of Deep Learning is that large amounts of labeled data are necessary to get good results without overfitting.

Medical images are difficult to annotate compared to ordinary photographs and videos. For example, different image modalities may introduce artifacts that are not readily identifiable by one without medical training. Moreover, reliable detection of organs and other relevant anatomical structures, as well as identification of relevant diseases and abnormalities, will be difficult, if not impossible unless the annotator has medical training. This makes medical image annotation more costly to obtain as the number of people able to perform this task is limited.

Current practices involve a sequential approach of first obtaining the annotations followed by algorithm development. Any benefits from creating the algorithm do not enhance the annotation acquisition. In this disclosure, we describe how the twin needs for segmentation algorithm development and segmentation training data can be combined into a single process for a more efficient development cycle. Improvements in the algorithm development will speed up the annotation, whereas at the same time the actions of the annotators are used to synchronously drive the learning algorithm.

SUMMARY

Embodiments of the present invention address and overcome one or more of the above shortcomings and drawbacks, by providing an integrated system of manual annotation and automatic segmentation for medical imaging tasks. The techniques described herein build upon machine learning techniques previously applied to object classification and semantic labeling problems to automate the segmentation correction process. The techniques described herein offer improvements to various computer-related technologies. For example, the disclosed techniques using computing systems to enable the automation of specific image annotation and segmentation tasks that previously could not be automated.

According to some embodiments, a method for training a segmentation correction model includes performing an iterative model training process over a plurality of iterations. During each iteration, an initial segmentation estimate for an image is provided to a human annotators via an annotation interface. The initial segmentation estimate identifies one or more anatomical areas of interest within the image. Interactions with the annotation interface are automatically monitored to record annotation information comprising one or more of (i) segmentation corrections made to the initial segmentation estimate by the annotators via the annotation interface, and (ii) interactions with the annotation interface performed by the annotators while making the corrections. A base segmentation machine learning model is trained to automatically create a base segmentation based on the image. Additionally, a segmentation correction machine learning model is trained to automatically perform the segmentation corrections based on the image.

In some embodiments of the aforementioned method, the annotation information further comprises an effort measurement indicative of an amount of effort expended by the annotators in making the corrections. This effort measurement can be used to determine when to terminate the training process. For example, if the effort measurement is equal to the convergence value, the iterative model training process may be terminated. Conversely, if the effort measurement is not equal to the convergence value, the base segmentation and segmentation correction machine learning models may be used to determine the initial segmentation estimate for a new image. Then, the iterative model training process can continue to the next iteration.

In some embodiments of the aforementioned method, the effort measurement is a time-based measurement and the convergence value is equal to a predetermined time value. In other embodiments, the effort measurement is a measurement of time spent by the annotators in making the corrections and number of interface motions made in making the corrections. In one embodiment, the image comprises a plurality of slices/volumes and the effort measurement includes a measurement of time spent in scrolling through the plurality of slices/volumes. In another embodiment, the effort measurement is a measurement of a number of mouse motions and the convergence value is equal to a predetermined number of mouse motions. The effort measurement can also be used in model training. For example, if the segmentation correction machine learning model is a convolutional neural network may be used to set one or more training weights used by the convolutional neural network.

According to another aspect of the present invention, a method for training a landmark location correction model includes performing an iterative model training process in a manner similar to the other methods discussed above. However, rather than relying on an initial segmentation estimate, initial landmark location estimates are provided for an image to a plurality of human annotators via an annotation interface. Each initial landmark location estimate identifies an anatomical landmark within the image.

According to other embodiments, a system for training a segmentation correction model includes an annotation system and a parallel computing platform. The annotation system is configured to provide an initial segmentation estimate for an image to a plurality of human annotators via an annotation interface. The initial segmentation estimate identifies one or more anatomical areas of interest within the image. The annotation system also automatically monitors interactions with the annotation interface to record annotation information comprising (i) segmentation corrections made to the initial segmentation estimate by the annotators via the annotation interface, and (ii) interactions with the annotation interface performed by the annotators while making the corrections. The parallel computing platform is configured to train a base segmentation machine learning model to automatically create a base segmentation based on the image. Additionally, the platform trains a segmentation correction machine learning model to automatically perform the segmentation corrections based on the image.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following figures.

DETAILED DESCRIPTION OF ILLUSTRATIVE EMBODIMENTS

The following disclosure describes the present invention according to several embodiments directed at methods, systems, and apparatuses related to automated manual annotation and automatic segmentation for medical imaging tasks. Briefly, an annotation system is used to collect an initial segmentation estimate. This initial segmentation estimate is then presented to one or more human annotators which make corrections to the initial segmentation estimate. Based on the corrections made by the annotators, and interactions made the annotators in making the corrections, a correction model and a segmentation model are trained. By learning the corrective actions taken by annotators to refine a segmentation result, the system described herein actively improves the segmentation model, which differs from training the model with cumulative annotated data.

Figure 1:
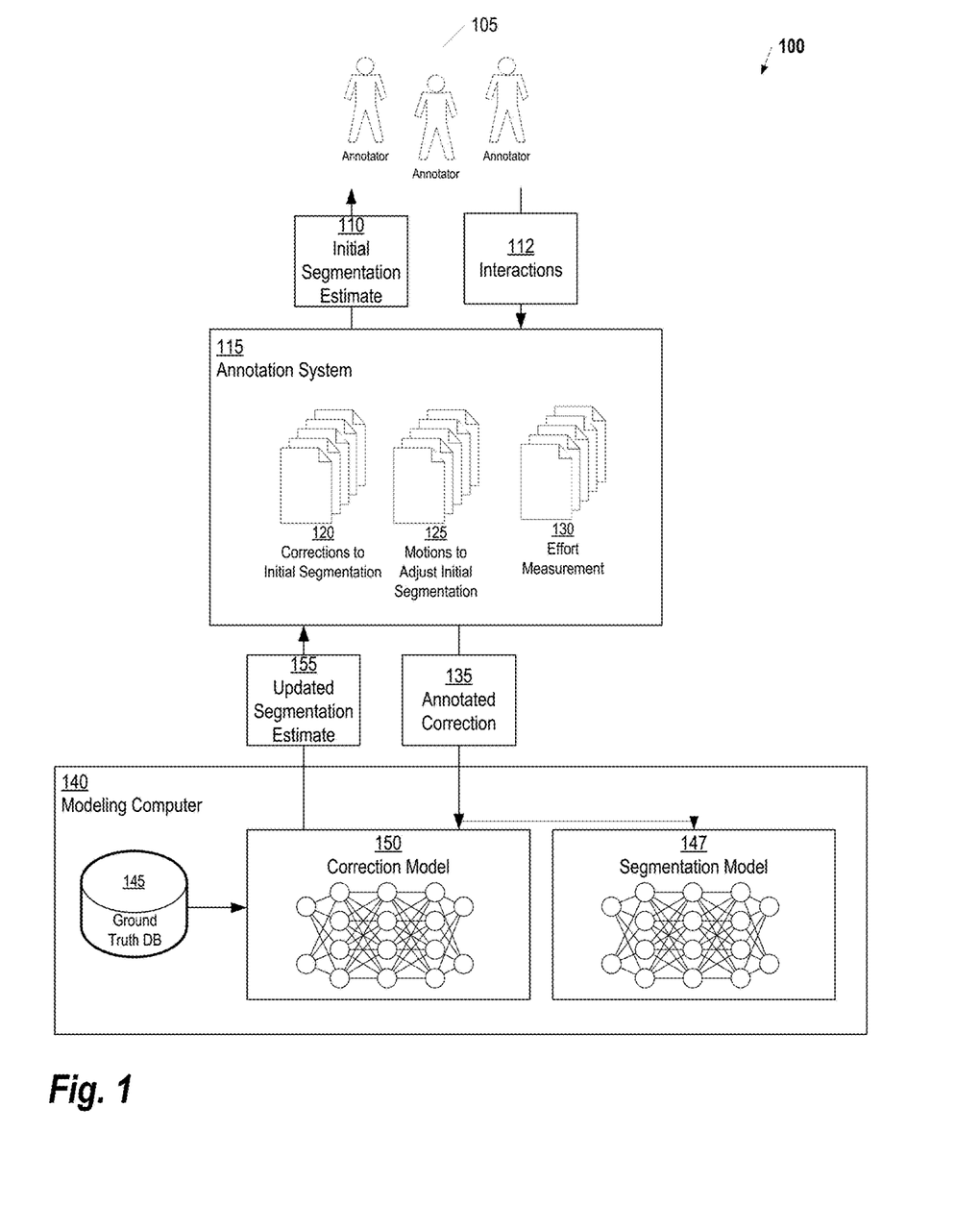
FIG. 1 is a view of a system for automating image segmentation, according to some embodiments.

FIG. 1 is a view of a system for automating image segmentation, according to some embodiments. An Initial Segmentation Estimate 110 is provided to Annotators 105 via an Annotation System 115. In some embodiments, this Initial Segmentation Estimate 110 is generated using an already developed segmentation method that needs improvement. For example, one or more conventional techniques generally known in the art may be used to provide a fast, but inaccurate segmentation which can be used as the Initial Segmentation Estimate 110. In other embodiments, the Initial Segmentation Estimate 110 can come from a simple ellipse placed by the user in the location of the object to be annotated. In yet another alternative, the initial segmentation estimate can be defined by labels (or "seeds") placed by the user. For example, the user may label certain pixels as "object" or "background." Once the labels have been provided, a generic seed-based algorithm such as the random walker algorithm may be applied to perform the segmentation.

Figure 2:
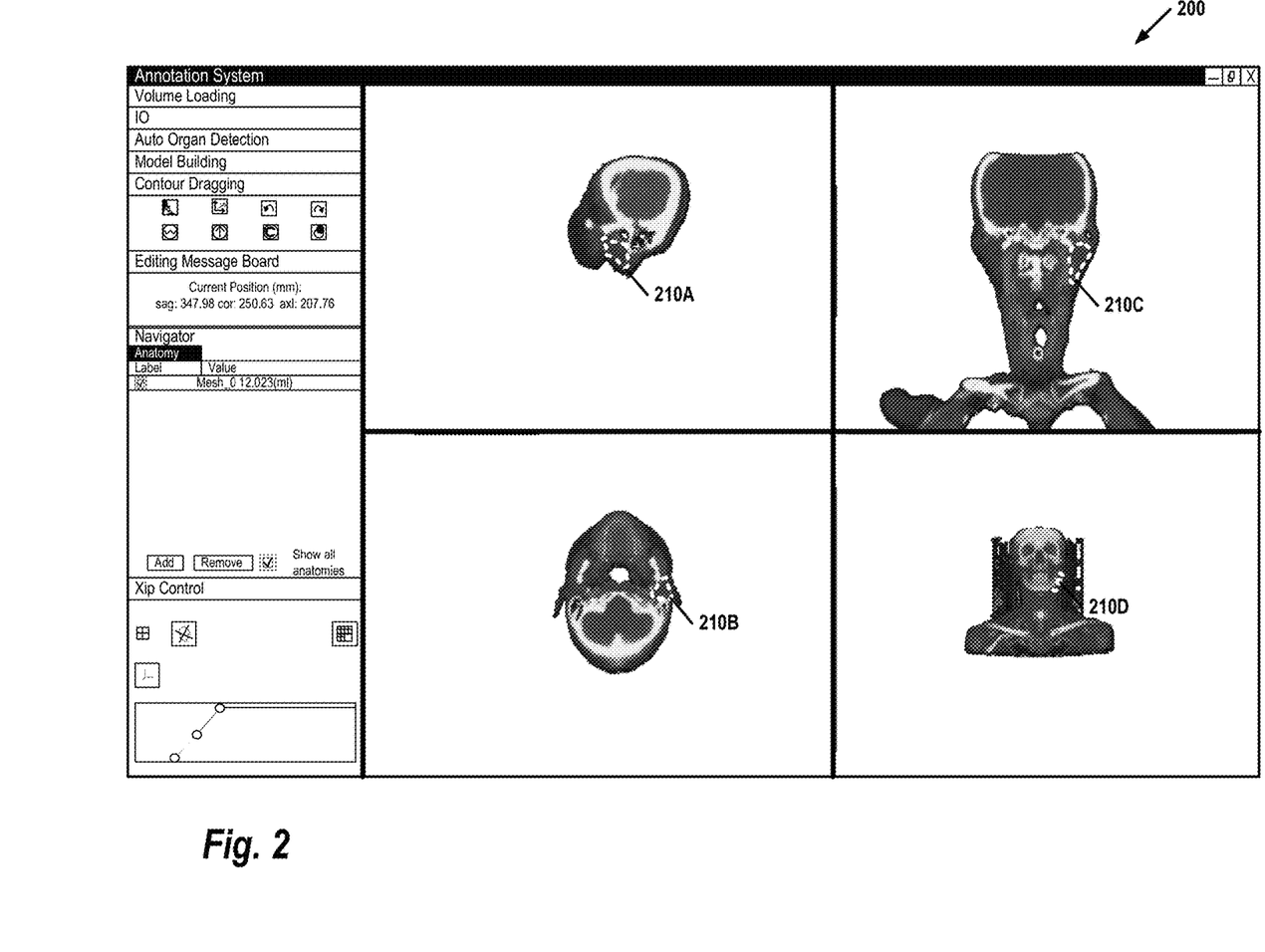
FIG. 2 shows an example interface used by an annotation system, according to some embodiments.

In general, the Annotation System 115 includes a system for presenting a graphical user interface (GUI) which allows the user to perform Interactions 112 (e.g., via mouse movements) which correct the Initial Segmentation Estimate 110. This GUI is referred to herein as an "annotation interface." The computing technology supporting this annotation interface can be implemented using any technique known in the art. For example, in some embodiments, the Annotation System 115 is installed as software on computing devices used by the Annotators 105. General purpose computing devices can be used in these embodiments, or specialized devices with additional software or hardware to facilitate image annotation. In other embodiments, the Annotation System 115 can be cloud based. Thus, the Annotators 105 interact through a browser or some other thin client interface to interact with the annotation interface. FIG. 2 provides an example Interface 200 that may be employed by the Annotation System 115. Here, an upper body anatomy is presented in a plurality of views and the user is presented with a variety of tools (located on the left hand side of the Interface 200) for adjusting the initial segmentation (indicated by segmentation lines 210A, 210B, 210C, and 210D in FIG. 2).

Based on the Interactions 112 shown in FIG. 1, the Annotation System 115 stores Corrections 120 that describe the refinement of the segmentation from initial estimate to ground truth. These Corrections 120 indicate one or more changes to the Initial Segmentation Estimate 110. For example, in some embodiments, the Initial Segmentation Estimate 110 is presented as a series of points around the outer edge of the anatomy to be segmented. The Annotators 105 may adjust the Initial Segmentation Estimate 110 by clicking and dragging these points until the boundary of the segmentation accurately reflects the edge of the anatomical area of interest. In this case the Corrections 120 could comprise the coordinates of the points in the new segmentation or adjustments to the points in the Initial Segmentation Estimate 110. In other embodiments, rather than storing the Corrections 120 as points, just the shape of the new segmentation may be included in the Corrections 120.

As the annotators perform the Interactions 112 with the Annotation System 115, the annotation system records their Motions 125 to adjust the initial estimate. Broadly speaking, the corrections may be thought of moving the contour inward in the case of over-segmentation, or moving the contour outward in the case of under-segmentation. These inward or outward motions, along with the places where they are performed, serve as input to a classifier, as described below. In addition to the Motions 125, the annotation system may record an Effort Measurement 130 which indicates the amount of effort expended by the annotators to perform the corrections. Effectively, the Effort Measurement 130 provides a measure of how close the initial result was to "perfect." Amount of effort may include, for example, overall time, number of mouse motions, amount of scrolling through slices for multi-slice images, etc. The effort measurement may be used, for example, to give larger weights to such cases during training, and to determine whether the overall system has converged.

It should be noted that the approach described above is not limited to segmentation of objects, but may also be used in other applications such as landmark or object detection. In these applications, the input is an initial guess of the landmark location, and the actions of the annotators to move the location to the correct location are recorded and used in the machine learning model described below. In addition, the amount of effort required may be recorded.

The Initial Segmentation Estimate 110 is combined with the Interactions 112, the Motions 125, and the Effort Measurement 130 to form an Annotated Correction 135 which is presented to a Modeling Computer 140. In some embodiments, the Annotated Correction 135 further includes the image data which is being analyzed. In other embodiments, the Annotated Correction 135 only includes an identifier (e.g., filename) of the image data which can then be used to retrieve the image data from the Annotation System 115, either locally at the Modeling Computer 140 or on another system (not shown in FIG. 1).

The Modeling Computer 140 is assumed to be connected to the Annotation System 115 via one or more networks (e.g., the Internet) not shown in FIG. 1; however, in some embodiments, the Modeling Computer 140 and the Annotation System 115 can be combined in a single computing system. The data included in the Annotated Correction 135 may be transmitted to the Modeling Computer 140 using any technique known in the art. For example, in one embodiment, the Annotated Correction 135 comprise a data file containing the Initial Segmentation Estimate 110 and a second data file describing the Interactions 112, the Motions 125, and the Effort Measurement 130 in a structured data language such as Extensible Markup Language (XML).

A Segmentation Model 147 (i.e., classifier) is also learned from the Annotated Correction 135. More specifically, the Segmentation Model 147 is trained to perform the segmentation provided in the Segmentation Model 147 when presented with corresponding image data. Thus, once trained the Segmentation Model 147 is capable of automatically segmenting an image without any need for manual annotation. The accuracy of the segmentation will be dependent on the level of training provided to the Segmentation Model 147. In some embodiments, the Segmentation Model 147 simply outputs a segmentation, but additional information may also be provided such as the accuracy of the segmentation (based on modeling results). Furthermore, in some embodiments, the Segmentation Model 147 may suggest more than one segmentation based on modeling results and a clinician can select the preferred segmentation based on manual inspection of the data.

The Modeling Computer 140 includes a Ground Truth Database 145 which stores the ground truth for each image presented to the Annotators 105 for segmentation. A Correction Model 150 (i.e., classifier) is learned from the difference between the Initial Segmentation Estimate 110 and the Annotated Correction 135 using a machine learning algorithm. The Effort Measurement 130 included in the Annotated Correction 135 is used to adjust the training weights so that the learning evolves faster when the estimate is far from the ground truth, and slows down when the estimate is close to the ground truth. Note that the learning step may occur after a certain amount of annotations have been performed or immediately after each annotation.

The Segmentation Model 147 and the Correction Model 150 may generally be any classifier known in the art. In one embodiment, the Segmentation Model 147 and the Correction Model 150 are organized as a recursive convolutional neural network. In another embodiment, the Segmentation Model 147 and the Correction Model 150 are organized as a generative adversarial neural network. Combinations of recursive convolutional and generative adversarial neural networks can also be used as well as other deep learning architectures.

When applied to an image, the Segmentation Model 147 generates a segmentation, referred to herein as the "base segmentation," for the image. The output of the Correction Model 147, when applied to the image, is referred to herein as the "segmentation correction" for the image. The base segmentation and the segmentation correction are combined as the Updated Segmentation Estimate 155 and input into the Annotation System 115. This Updated Segmentation Estimation 155 is provided to the Annotators 105 via the Annotation System 115. In this way, the work load on the Annotators 105 is systematically reduced as the Segmentation Model 147 and the Correction Model 150 become better at automating segmentation. The process of presenting a segmentation and using annotated corrections to train the models may be repeated until the system converges at which point training is complete.

As an example implementation of the techniques described above with reference to FIG. 1, consider a task of 3D liver segmentation on CT. The Modeling Computer 140 can use a fully convolutional neural network to learn the base segmentation and the correction provided by the annotators. The system continues to update both the segmentation and correction models along with new incoming annotations until the effort of correction by the annotators is close to or at zero, or meets the accuracy required by the task.

By taking this approach, the system collects only as much training data as is needed to achieve the goal. In contrast to traditional learning approaches, where researchers must guess how much training data is required by a task, the method described above more efficiently limits the amount of data collected to what is needed. As a result, the amount of annotation resources required to support algorithm development can be reduced. Moreover by continuously incorporating improvements in the algorithm from what is learned by earlier corrections, the efforts of the annotators are continuously reduced on subsequent passes. Since most annotators are paid by the hour, this will result in a considerable saving in the overall cost of developing new algorithms.

Figure 3:
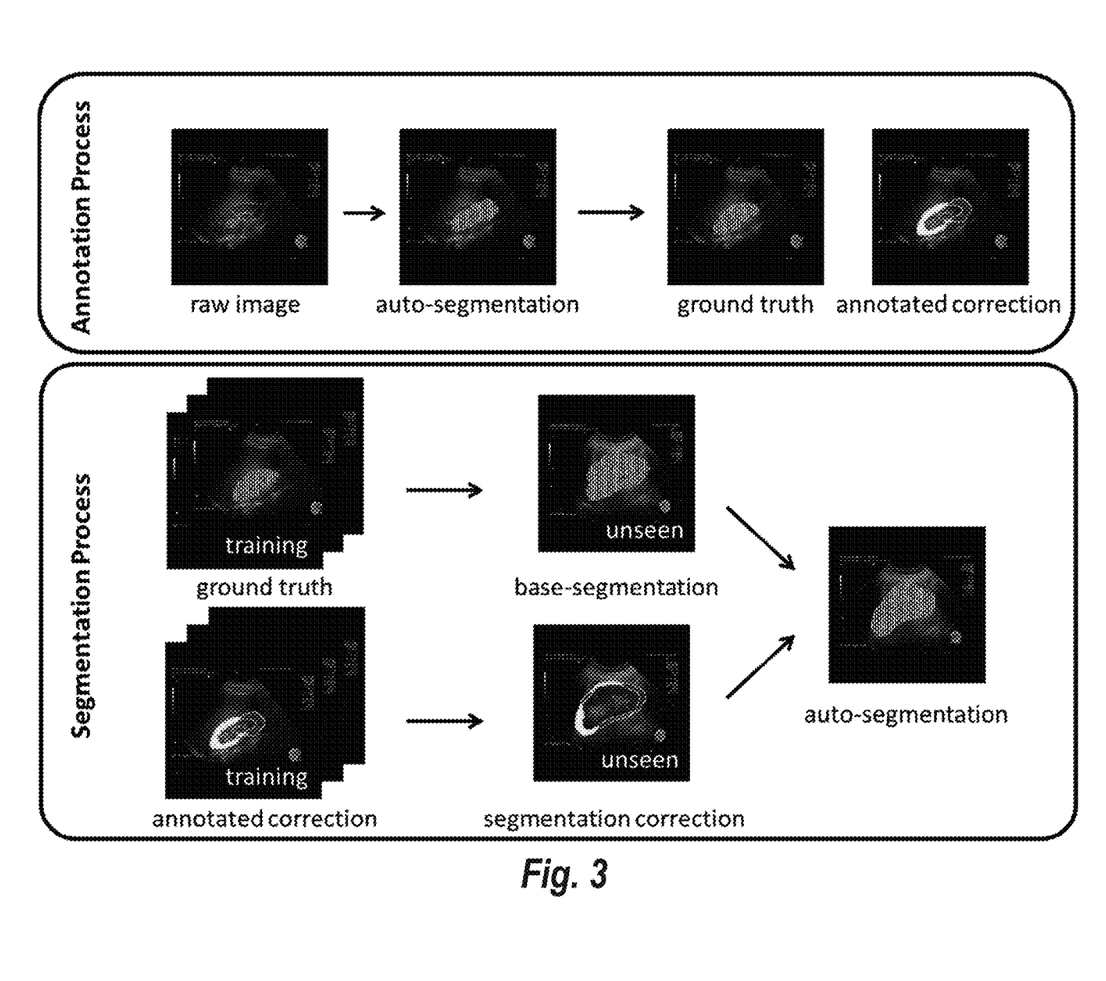
FIG. 3 illustrates an example of the overall annotation/segmentation process, according to some embodiments.

FIG. 3 illustrates an example of the overall annotation/segmentation process, with the actions of the annotator on top and the actions of the segmentation algorithm on bottom. The images depict an organ to be segmented. The segmentation result for an organ is shown as cross-hatch pattern, the white outlined clear sections indicate the areas of over-segmentation, and white filled sections indicate the areas of under-segmentation. The actions of the annotators to correct these areas are used as inputs to the training algorithm. The amount of effort required to make the correction is used to adjust the training weights and detect convergence.

Figure 4:
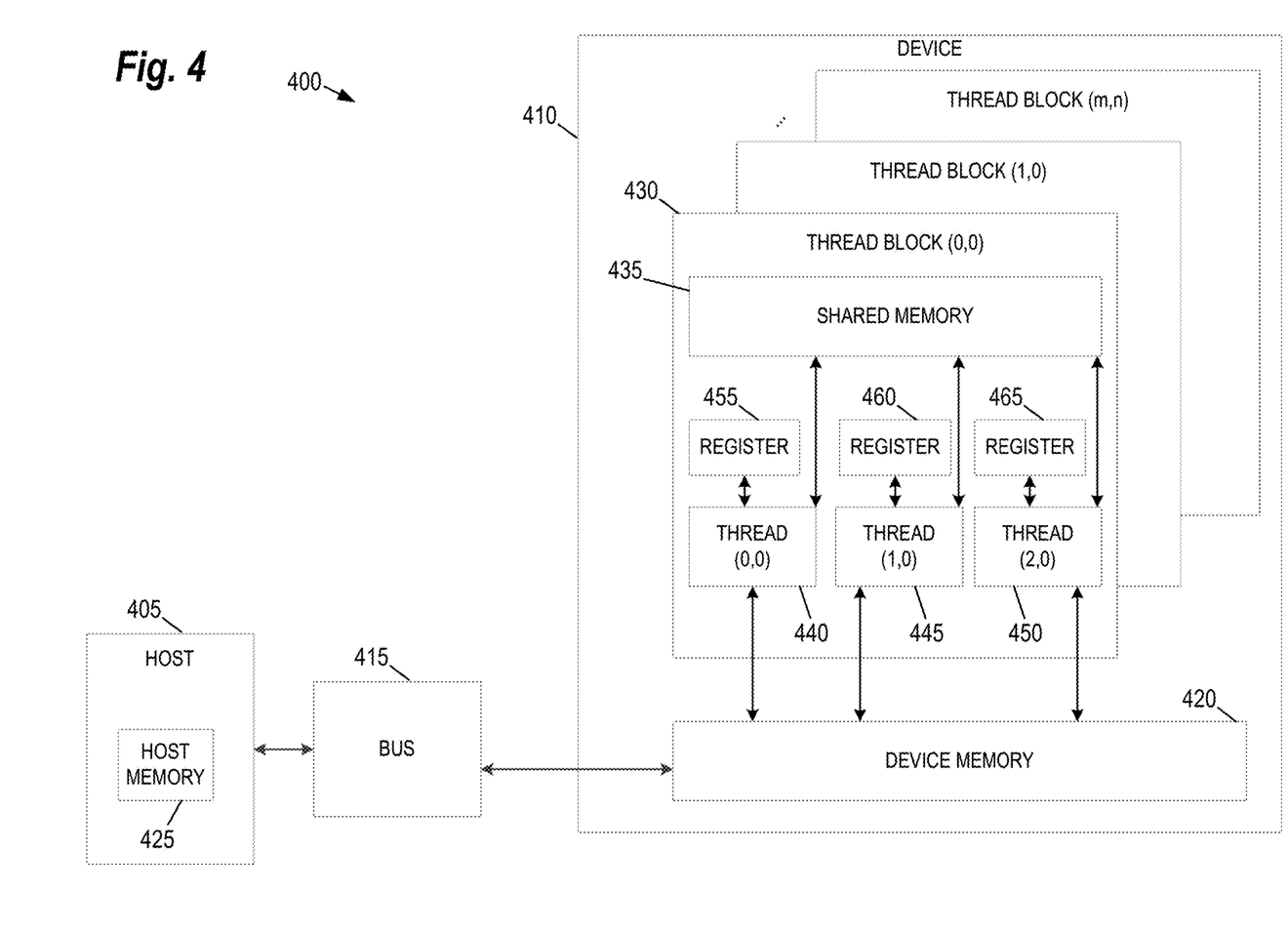
FIG. 4 provides an example of a parallel processing memory architecture that may be utilized to implement one or more components shown in FIG. 1, according to some embodiments of the present invention.

FIG. 4 provides an example of a parallel computing platform 400 that may be utilized to implement the modeling computer 140 shown FIG. 1, according to some embodiments of the present invention. This platform 400 may be used in embodiments of the present invention where NVIDIA CUDA™ (or a similar parallel computing platform) is used. The architecture includes a host computing unit ("host") 405 and a graphics processing unit (GPU) device ("device") 410 connected via a bus 415 (e.g., a PCIe bus). The host 405 includes the central processing unit, or "CPU" (not shown in FIG. 4), and host memory 425 accessible to the CPU. The device 410 includes the graphics processing unit (GPU) and its associated memory 420, referred to herein as device memory. The device memory 420 may include various types of memory, each optimized for different memory usages. For example, in some embodiments, the device memory includes global memory, constant memory, and texture memory.

Parallel portions of a big data platform and/or big simulation platform (see FIG. 4) may be executed on the platform 400 as "device kernels" or simply "kernels." A kernel comprises parameterized code configured to perform a particular function. The parallel computing platform is configured to execute these kernels in an optimal manner across the platform 400 based on parameters, settings, and other selections provided by the user. Additionally, in some embodiments, the parallel computing platform may include additional functionality to allow for automatic processing of kernels in an optimal manner with minimal input provided by the user.

The processing required for each kernel is performed by grid of thread blocks (described in greater detail below). Using concurrent kernel execution, streams, and synchronization with lightweight events, the platform 400 of FIG. 4 (or similar architectures) may be used to parallelize portions of the model based operations performed in training the Correction Model 150 or the Segmentation Model 147 shown in FIG. 1

The device 410 includes one or more thread blocks 430 which represent the computation unit of the device 410. The term thread block refers to a group of threads that can cooperate via shared memory and synchronize their execution to coordinate memory accesses. For example, in FIG. 4, threads 440, 445 and 450 operate in thread block 430 and access shared memory 435. Depending on the parallel computing platform used, thread blocks may be organized in a grid structure. A computation or series of computations may then be mapped onto this grid. For example, in embodiments utilizing CUDA, computations may be mapped on one-, two-, or three-dimensional grids. Each grid contains multiple thread blocks, and each thread block contains multiple threads. For example, in FIG. 4, the thread blocks 430 are organized in a two dimensional grid structure with m+1 rows and n+1 columns. Generally, threads in different thread blocks of the same grid cannot communicate or synchronize with each other. However, thread blocks in the same grid can run on the same multiprocessor within the GPU at the same time. The number of threads in each thread block may be limited by hardware or software constraints.

Continuing with reference to FIG. 4, registers 455, 460, and 465 represent the fast memory available to thread block 430. Each register is only accessible by a single thread. Thus, for example, register 455 may only be accessed by thread 440. Conversely, shared memory is allocated per thread block, so all threads in the block have access to the same shared memory. Thus, shared memory 435 is designed to be accessed, in parallel, by each thread 440, 445, and 450 in thread block 430. Threads can access data in shared memory 435 loaded from device memory 420 by other threads within the same thread block (e.g., thread block 430). The device memory 420 is accessed by all blocks of the grid and may be implemented using, for example, Dynamic Random-Access Memory (DRAM).

Each thread can have one or more levels of memory access. For example, in the platform 400 of FIG. 4, each thread may have three levels of memory access. First, each thread 440, 445, 450, can read and write to its corresponding registers 455, 460, and 465. Registers provide the fastest memory access to threads because there are no synchronization issues and the register is generally located close to a multiprocessor executing the thread. Second, each thread 440, 445, 450 in thread block 430, may read and write data to the shared memory 435 corresponding to that block 430. Generally, the time required for a thread to access shared memory exceeds that of register access due to the need to synchronize access among all the threads in the thread block. However, like the registers in the thread block, the shared memory is typically located close to the multiprocessor executing the threads. The third level of memory access allows all threads on the device 410 to read and/or write to the device memory. Device memory requires the longest time to access because access must be synchronized across the thread blocks operating on the device. Thus, in some embodiments, the processing of each individual annotation in the Annotated Correction 135 is coded such that it primarily utilizes registers and shared memory and only utilizes device memory as necessary to move data in and out of a thread block.

The embodiments of the present disclosure may be implemented with any combination of hardware and software. For example, aside from parallel processing architecture presented in FIG. 4, standard computing platforms (e.g., servers, desktop computer, etc.) may be specially configured to perform the techniques discussed herein. In addition, the embodiments of the present disclosure may be included in an article of manufacture (e.g., one or more computer program products) having, for example, computer-readable, non-transitory media. The media may have embodied therein computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f), unless the element is expressly recited using the phrase "means for."

We claim:

1. A method for training a segmentation correction model, the method comprising:
    performing an iterative model training process over a plurality of iterations, wherein each iteration comprises:
        providing an initial segmentation estimate for an image to a plurality of human annotators via an annotation interface, wherein the initial segmentation estimate identifies one or more anatomical areas of interest within the image;
        automatically monitoring interactions with the annotation interface to record annotation information comprising one or more of (i) segmentation corrections made to the initial segmentation estimate by the annotators via the annotation interface, (ii) interactions with the annotation interface performed by the annotators while making the corrections, and (iii) an effort measurement indicative of an amount of effort expended by the annotators in making the corrections;
        training a base segmentation machine learning model to automatically create a base segmentation based on the image; and
        training a segmentation correction machine learning model to automatically perform the segmentation corrections based on the image;
        if the effort measurement is equal to a convergence value, terminating the iterative model training process; and
        if the effort measurement is not equal to the convergence value, using the base segmentation machine learning model and segmentation correction machine learning model to determine the initial segmentation estimate for a new image and continuing to a next iteration of the iterative model training process;
    wherein the effort measurement is a measurement of a number of user-generated mouse motions with respect to the annotation interface, and the convergence value is equal to a predetermined number of user-generated mouse motions with respect to the annotation interface.

2. The method of claim 1, wherein the effort measurement further comprises a time-based measurement and the convergence value further comprises a predetermined time value.

3. The method of claim 2, wherein the time-based measurement is a measurement of time spent by the annotators in making the corrections.

4. The method of claim 2, wherein the image comprises a plurality of slices/volumes and the effort measurement includes a measurement of time spent in scrolling through the plurality of slices/volumes.

5. The method of claim 1, wherein the segmentation correction machine learning model is a convolutional neural network.

6. The method of claim 5, wherein the effort measurement is used to set one or more training weights used by the convolutional neural network.

7. A method for training a landmark location correction model, the method comprising:
    performing an iterative model training process over a plurality of iterations, wherein each iteration comprises:
        providing initial landmark location estimates for an image to a plurality of human annotators via an annotation interface, wherein each initial landmark location estimate identifies an anatomical landmark within the image;
        automatically monitoring interactions with the annotation interface to record annotation information comprising (i) corrections to the initial landmark location estimates made by the annotators via the annotation interface, (ii) interactions with the annotation interface performed by the annotators while making the corrections, and (iii) an effort measurement indicative of an amount of effort expended by the annotators in making the corrections;
        training a landmark location machine learning model to automatically identify landmark locations in the image based on the annotation information;
        training a location correction machine learning model to automatically perform the corrections to the initial landmark location estimates;
        if the effort measurement is equal to a convergence value, terminating the iterative model training process; and
        if the effort measurement is not equal to the convergence value, using the landmark location and the location correction machine learning model to determine the initial landmark location estimate for a new image and continuing to a next iteration of the iterative model training process,
    wherein the effort measurement is a measurement of a number of user-generated mouse motions with respect to the annotation interface, and the convergence value is equal to a predetermined number of user-generated mouse motions with respect to the annotation interface.

8. The method of claim 7, wherein the effort measurement further comprises a time-based measurement and the convergence value further comprises a predetermined time value.

9. The method of claim 8, wherein the time-based measurement is a measurement of time spent by the annotators in making the corrections.

10. The method of claim 8, wherein the image comprises a plurality of slices and the effort measurement further comprises a measurement of time spent in scrolling through the plurality of slices.

11. The method of claim 7, wherein the location correction machine learning model is a convolutional neural network.

12. The method of claim 11, wherein the effort measurement is used to set one or more training weights used by the convolutional neural network.

13. A system for training a segmentation correction model by performing an iterative model training process over a plurality of iterations, the system comprising:
- an annotation system configured to:
  - provide an initial segmentation estimate for an image to a plurality of human annotators via an annotation interface, wherein the initial segmentation estimate identifies one or more anatomical areas of interest within the image;
  - automatically monitor interactions with the annotation interface to record annotation information comprising (i) segmentation corrections made to the initial segmentation estimate by the annotators via the annotation interface, and (ii) interactions with the annotation interface performed by the annotators while making the corrections, and (iii) an effort measurement indicative of an amount of effort expended by the annotators in making the corrections;
- a parallel computing platform configured to:
  - train a base segmentation machine learning model to automatically create a base segmentation based on the image; and
  - train a segmentation correction machine learning model to automatically perform the segmentation corrections based on the image;
  - if the effort measurement is equal to a convergence value, terminate the iterative model training process; and
  - if the effort measurement is not equal to the convergence value, use the base segmentation machine learning model and segmentation correction machine learning model to determine the initial segmentation estimate for a new image and continue to a next iteration of the iterative model training process;
  - wherein the effort measurement is a measurement of a number of user-generated mouse motions with respect to the annotation interface, and the convergence value is equal to a predetermined number of user-generated mouse motions with respect to the annotation interface.

14. The system of claim 13, wherein the segmentation correction machine learning model is a convolutional neural network and the effort measurement is used to set one or more training weights used by the convolutional neural network.

* * * * *